Patented June 28, 1927.

1,634,090

UNITED STATES PATENT OFFICE.

ARTHUR ZITSCHER AND ROBERT SCHMITT, OF OFFENBACH-ON-THE-MAIN, GERMANY, ASSIGNORS TO I. G. FARBENINDUSTRIE AKTIENGESELLSCHAFT, OF FRANKFORT-ON-THE-MAIN, GERMANY.

DI-ACYLACETYL-ARYLENEDIAMINE AND PROCESS OF MAKING SAME.

No Drawing.   Application filed May 15, 1923. Serial No. 639,215.

Our invention relates to new di-acylacetyl-diamino compounds of the general formula:

Y·CO·CH$_2$·CO·NH—arylene—NH·CO·CH$_2$·CO·Y, wherein Y means any radicle of the hydrocarbon series containing at least one and not more than six carbon atoms, this term including aliphatic as well as aromatic radicles.

The process of making the new compounds consists in heating arylenediamines, such as benzene-, naphthalene- or anthracenediamines or their substitution products with acyl-acetic acid esters preferably in a solvent or diluent.

The new di-acylacetyl-diamino compounds may be used as primary products for the manufacture of dyestuffs.

The following example illustrates the invention, the parts being by weight and the temperature in centigrade degrees:

*Example.*

Into a mixture, heated to about 180°, of 205 parts of acetoacetic acid ester and 200 parts of nitrobenzene 36 parts of para-phenylenediamine are poured slowly while stirring. The mixture is held at this temperature for some time and then allowed to cool. The yellow crystalline precipitate, formed after cooling down, is filtered, washed with ether and dried. For purifying the resulting di-acetoacetyl-1.4-phenylenediamine is crystallized from a very dilute aqueous solution and obtained in form of fine, colorless needles, melting at 167° with decomposition. It is soluble in water and alcohol.

Instead of acetoacetic acid ester its homologues and analogues, such as benzoylacetic acid ester can be used, with other diamines the process can be conducted in a similar manner.

In the following table the properties of some of the compounds obtainable according to the present process are described:

| Di-acylacetyl-compound. | Aspect. | Crystallized from— | Melting point °C. not corrected. | Solubility. |
|---|---|---|---|---|
| Di-acetoacetyl-1.4-phenyl-enediamine. | Fine, colorless needles. | Water. | 167° under decomposition. | Soluble in water and alcohol. |
| Di-acetoacetyl-1.4-naphthylenediamine. | Colorless, feebly lustrous spear-shaped clusters of crystals. | Acetonitril. | 197° under decomposition. | Soluble in acetonitril, less soluble in alcohol, glacial acetic acid and xylene. |
| Di-acetoacetyl-1.5-naphthylenediamine. | Silver-grey, lustrous tiny scales. | Glacial acetic acid. | 249–250° under decomposition. | Soluble in glacial acetic acid, less soluble in alcohol. |
| Di-acetoacetyl-2.6-naphthylenediamine. | Clusters of lustrous needles. | Alcohol. | 203–204° under decomposition. | Soluble in alcohol and glacial acetic acid. |

The three compounds of naphthylenediamines specified in the above table all correspond to the following general formula CH$_3$·CO·CH$_2$·CO·NH—naphthylene—NH·CO·CH$_2$·CO·CH$_3$.

The formula of di-acetoacetyl-1.4-naphthylenediamine is

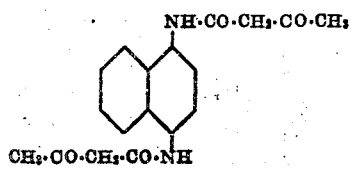

The formula of di-acetoacetyl-1.5-naphthylenediamine is

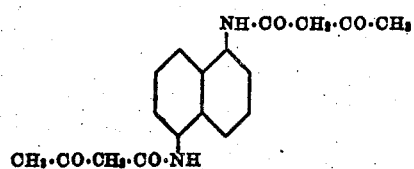

The formula of di-acetoacetyl-2.6-naphthylenediamine is

Now what we claim and desire to secure by Letters Patent is the following:

1. A process of making di-acylacetyl-arylenediamines consisting in heating acylacetic acid esters with arylenediamines.

2. As new articles the di-acylacetyl-diamino compounds of the general formula:

$$Y \cdot CO \cdot CH_2 \cdot CO \cdot NH\text{—arylene—}NH \cdot CO \cdot CH_2 \cdot CO \cdot Y,$$

Y meaning any radicle of the hydrocarbon series containing at least one and not more than six carbon atoms.

3. As new articles the di-acetoacetyl-diamino compounds of the formula:

$$CH_3 \cdot CO \cdot CH_2 \cdot CO \cdot NH\text{—naphthylene—}NH \cdot CO \cdot CH_2 \cdot CO \cdot CH_3.$$

4. As a new article di-acetoacetyl-2.6-naphthylenediamine of the formula:

5. A process of making di-acylacetyl-arylenediamines, which consists in heating acylacetic acid esters with arylenediamines in the presence of a diluent.

In testimony, that we claim the foregoing as our invention, we have signed our names, this 28th day of April, 1923.

ARTHUR ZITSCHER. [L. S.]
ROBERT SCHMITT. [L. S.]